Oct. 13, 1964    M. DIXON    3,152,566
TOOL FOR WELDING EXPANDED ALUMINUM
Filed Dec. 7, 1960

*INVENTOR.*
MICHAEL DIXON
BY
ATTORNEY

ID
3,152,566
TOOL FOR WELDING EXPANDED ALUMINUM
Michael Dixon, Havertown, Pa. (% Philadelphia Electric Co., 1000 Chestnut St., Philadelphia, Pa.)
Filed Dec. 7, 1960, Ser. No. 74,385
3 Claims. (Cl. 113—111)

This invention relates to tools for welding expanded aluminum and more particularly for the welding of such expanded aluminum to aluminum straps and the like.

Compartment doors, barriers, open panels and the like are advantageously constructed from expanded aluminum gratings and for this purpose, the expanded aluminum is welded at spaced locations to a framework of aluminum strap.

Because of the difficulty encountered in the welding of these aluminum components, this is customarily performed in what is known as the "heliarc" process. In this process, a tungsten electrode is provided projecting from a helium nozzle. The free end of this electrode is centered in one of the openings of the expanded aluminum mesh contiguous to the place at which attachment by welding is desired, and an arc is drawn to the underlying aluminum strap. As soon as a bright molten puddle of aluminum is formed on the strap, a small diameter welding or filler rod is fed into the tungsten electrode and the puddle of molten aluminum is built up on the strap at the middle of the mesh opening. This molten puddle is then brushed or flowed over to the strand intersection at one side of the mesh opening of the expanded aluminum by a wiping movement of the tungsten electrode and filler rod as a unit. Upon solidification, this molten material welds the expanded metal to the strap.

Welds made in this manner have frequently proved defective. Upon the application of heat from the arc, and even with the helium present as an inert cooling agent, one or more of the strands frequently melts away from the intersection leaving unsightly protruding sharp points and providing a relatively weak welded connection.

The techniques useful for the welding of expanded sheet steel to steel straps, because of the heat transfer characteristics of the steel, have not furnished any assistance in connection with the difficulties encountered with expanded aluminum.

It is the principal object of the present invention to provide a simple and inexpensive tool with which expanded aluminum can be welded to aluminum strap in a simple but effective manner with damage to the strands avoided and with welds of improved strength and appearance quickly and easily provided.

It is a further object of the present invention to provide a tool for welding expanded aluminum which is so constructed and arranged that when the same is positioned at the place of use, it is self-supporting and the welding operation may be effected without requiring attention to the tool.

It is a further object of the present invention to provide a welding tool for welding expanded aluminum which is so constructed and arranged as to be self-positioning at the place of use.

Other objects and advantageous features of the invention will be apparent from the description and claims.

The nature and characteristic features of the invention will be more readily understood from the following description, taken in connection with the accompanying drawings forming part thereof, in which.

Figure 1:
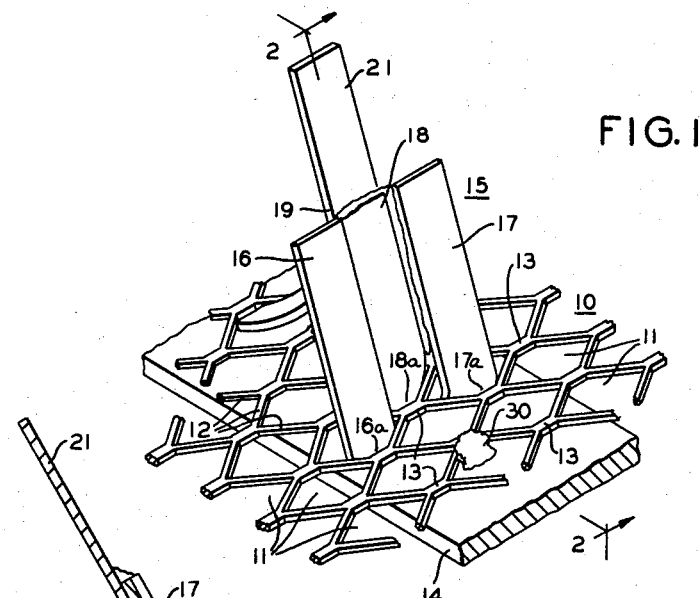
FIGURE 1 is a view in perspective showing a welded joint of expanded aluminum and aluminum strap and a tool for welding expanded aluminum in accordance with the invention in position for welding another joint as seen from the side at which the welding is effected.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings, a fragmentary piece of foraminous aluminum in the form of expanded aluminum mesh is shown at 10 and includes openings 11 staggered in alternate rows, of generally flattened hexagonal shape, as seen on either face. The openings 11 are each surrounded by a plurality of strands 12 formed by slitting sheet metal and expanding the same to open the material at the slits in a well known manner.

The strands 12 intersect at common short side margins 13 of uncut and unsevered material and at these margins 13 there is a greater thickness or concentration of metal than in the strands 12.

The strap 14, of aluminum, to which the expanded aluminum mesh 10 is to be welded is of metal which may be of the same thickness as that from which the expanded aluminum mesh 10 was originally formed, but is effectively of greater concentrated mass and cross section in the form used and of greater effective width and thickness.

Figure 2:
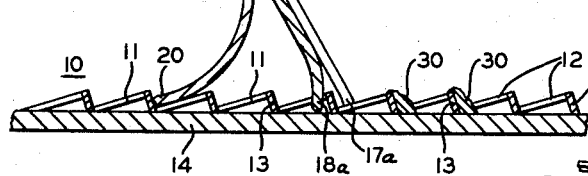
FIG. 2 is a vertical sectional view taken approximately on the line 2—2 of FIG. 1.

Referring now more particularly to FIGS. 1 and 2 of the drawings, the tool 15 as there illustrated preferably includes a body formed of a plurality of strips 16, 17 and 18 of metal welded or otherwise secured together. The assembled strips 16, 17 and 18 provide a pair of front finger strips having lower ends 16a and 17a capable of extending down and into a pair of openings 11 and in the direction of the greater dimension of the openings 11 and on opposite sides of a margin 13. A rear finger strip, provided by the strip 18, extends in diverging relation to the finger provided by the strips 16 and 17, and terminates at a location such that its lower end 18a extends into an opening 11 between and to one side of the openings 11 into which the front finger strips 16 and 17 extend. The faces of the front finger strips 16 and 17 and the rear finger strip 18 may, if desired, be of convex shape or a shape complemental to the shape of the strands 12 and their margin 13 so as to provide a larger area for contact with the strands 12. A rear supporting leg 19 is provided, preferably having an inclined lower end 20 and with the lower terminus adapted to engage the strands 12 of an opening 11, a plurality of rows from the row in which the lower ends 16a and 17a of the finger strips 16 and 17 and the lower end 18a of the finger strip 18 are disposed.

The supporting leg 19 preferably has an upward extension 21 which serves as a handle for facilitating the placing of the tool with the lower ends 16a and 17a of the strips 16 and 17 and the lower end 18a of the strip 18 at the desired locations with respect to the expanded aluminum mesh 10.

Figure 3:
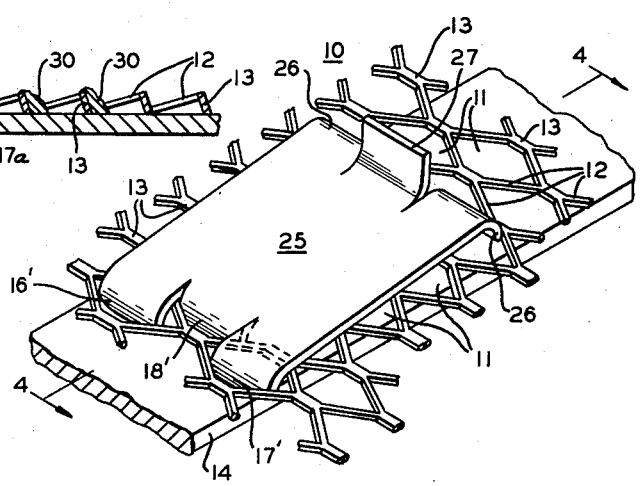
FIG. 3 is a perspective view showing expanded aluminum in position on an aluminum strap with another preferred form of tool for welding expanded aluminum in accordance with the present invention in position for welding.
Figure 4:
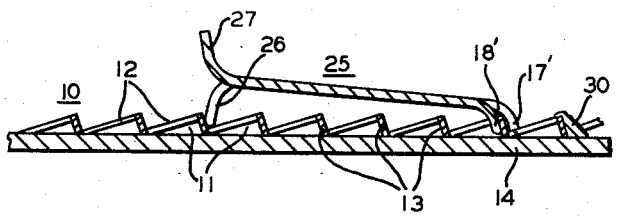
FIG. 4 is a longitudinal sectional view taken approximately on the line 4—4 of FIG. 3.

In FIGS. 3 and 4 a modified form of the invention is shown in which a body 25 is provided, made of a single piece of material and with a pair of spaced fingers 16' and 17' bent at an angle with respect thereto, with a central finger 18' therebetween for engagement respectively with three openings 11 in the expanded aluminum 10. The body 25 preferably has a pair of spaced downwardly extending feet 26 at the opposite end with an upwardly bent handle portion 27 for manual manipulation.

It will be noted that the feet 26 retain the body 25 intermediate its ends in spaced relation to and out of contact with the strands 12 between the fingers 16′, 17′ and 18′ and the feet 26.

It has been ascertained that the fingers 16, 17 and 18, or 16′, 17′ and 18′ are advantageously made of copper or stainless steel of the thickness of the order of one-eighth inch which will provide the desired heat transfer from the intersections at 13 of the strands 12. It has also been ascertained that aluminum is not a satisfactory material because of the tendency to cause the tool, if made of aluminum, to be welded to the aluminum strands 12 upon accidental striking of the same with the welding arc.

The mode of use will, it is thought, be apparent from the foregoing, but it may be noted that the lower ends 16a and 17a of fingers 16 and 17 or the fingers 16′ and 17′ are inserted in openings 11 at locations at either side of the opening 11 at which the welding is to be effected. The rear finger 18 or 18′ is then inserted in an opening 11 at the opposite side of the intersection 13 from that at which the weld is to be made. It will be noted that the intersection 13 is thus enclosed at three sides thereof, and the space between the fingers 16, 17 and 18 or 16′, 17′ and 18′ permits of ready access to the upper face of the intersection 13 where the weld is to be made.

When the puddle of molten aluminum is formed on the strap 14 and is supplemented by additional metal from the welding or filler rod, the molten metal is moved over to the intersection 13 and permitted to solidify as indicated at 30. Burning of the contiguous portions of the strands 12 is avoided by the heat transfer from the strands 12 by their contact with the lower ends 16a, 17a and 18a, or the fingers 16′, 17′ and 18′. At the same time the heat transfer is not excessive or of a character to prevent proper welding of the intersection 13 to the strap 14.

It is essential that the heat conducting body of the tool be spaced from the strands 12 of the expanded aluminum mesh 10. Should the feet be removed from the body so that the body comes into contact with the aluminum mesh 10 an excessive amount of heat will be conducted to the underlying aluminum strap 14 rearwardly of the welding region with resultant overheating of the entire contiguous area and melting of the strands 12 before welding can be satisfactorily accomplished.

I claim:

1. A tool for welding expanded aluminum mesh having openings staggered in alternate rows and surrounded by a plurality of strands with intersections at side margins to a strap which comprises a metallic heat conducting body having at least three spaced fingers extending generally in the same direction from one end thereof and simultaneously insertable in openings in the mesh at three sides of an intersection and being so proportioned with respect to said mesh as to be in simultaneous heat transfer engagement with all the strands meeting at said intersection when so inserted in the mesh, and a member extending from said body for supporting said body in spaced relation to said mesh.

2. A tool for welding expanded aluminum mesh having openings staggered in alternate rows and surrounded by a plurality of strands with intersections at side margins to a metallic strap in juxtaposition with said mesh comprising a metallic heat conducting body having a plurality of spaced fingers extending in the same direction from one end thereof and including a pair of fingers having aligned surfaces and being spaced for insertion in respective contiguous aligned openings in the mesh and a third finger between and rearwardly of said pair of fingers and arranged for insertion in the mesh opening intermediate and contiguously rearward of said aligned mesh openings, said tool being capable of having the ends of said pair of fingers and of said third finger simultaneously disposed respectively within said aligned and intermediate mesh openings in simultaneous heat transfer relation with the strands meeting at the intersection common to said aligned and intermediate openings, and said body and said fingers being so proportioned in relation to said mesh that when said fingers are disposed in said respective openings with their tips abutting said juxtaposed strap and their forward surfaces making heat transfer contact with the respective adjacent strands meeting at said common intersection heat will be removed from said adjacent strands during welding of said common intersection to said strap at a rate sufficient to prevent said adjacent strands from melting.

3. A tool as defined in claim 2 in which said body has extending therefrom a member for supporting said body in spaced relation to said aluminum mesh.

References Cited by the Examiner

UNITED STATES PATENTS

| | | | |
|---|---|---|---|
| 1,134,905 | 4/15 | Prochaska | 294—27 |
| 1,667,973 | 5/28 | Kircher | 294—27 |
| 1,998,771 | 4/35 | Smith | 294—27 |
| 2,280,150 | 4/42 | Hasse et al. | 219—137 XR |
| 2,472,523 | 6/49 | Dillon et al. | 113—111 |
| 2,584,072 | 1/52 | White | 113—111 |
| 2,784,301 | 3/57 | Landis et al. | 219—137 |
| 2,922,870 | 1/60 | Collins et al. | 219—161 |
| 3,049,610 | 8/62 | Addison et al. | 219—137 |

FOREIGN PATENTS 448,282   5/48   Canada.

CHARLES W. LANHAM, *Primary Examiner.*

J. F. CAMPBELL, NEDWIN BERGER, *Examiners.*